(12) United States Patent
Singhal

(10) Patent No.: US 8,897,826 B2
(45) Date of Patent: Nov. 25, 2014

(54) SYSTEM AND METHOD FOR A CELLULAR COMMUNICATION NETWORKS ORIGINATED 911 CALL EMERGENCY RESPONSE SYSTEM

(76) Inventor: Tara Chand Singhal, Torrance, CA (US)

(*) Notice: Subject to any disclaimer, the term of this patent is extended or adjusted under 35 U.S.C. 154(b) by 5 days.

(21) Appl. No.: 13/473,504

(22) Filed: May 16, 2012

(65) Prior Publication Data

US 2013/0244611 A1  Sep. 19, 2013

Related U.S. Application Data

(60) Provisional application No. 61/612,889, filed on Mar. 19, 2012, provisional application No. 61/631,527, filed on Jan. 5, 2012.

(51) Int. Cl.
| | |
|---|---|
| *H04M 11/04* | (2006.01) |
| *H04M 3/42* | (2006.01) |
| *H04W 4/00* | (2009.01) |
| *H04L 29/06* | (2006.01) |
| *H04W 24/00* | (2009.01) |
| *H04B 7/00* | (2006.01) |

(52) U.S. Cl.
USPC ............. 455/521; 455/404.1; 455/404.2; 455/412.2; 455/414.3; 455/433; 455/435.1; 455/456.1; 455/456.2; 455/456.3; 455/456.5; 455/456.6

(58) Field of Classification Search
USPC .......... 455/404.1, 404.2, 412.2, 414.3, 433, 455/435.1, 436, 456.1, 456.2, 456.3, 456.4, 455/456.5, 456.6, 466, 521, 556.1; 340/539.13
See application file for complete search history.

(56) References Cited

U.S. PATENT DOCUMENTS

| | | | |
|---|---|---|---|
| 7,177,623 B2* | 2/2007 | Baldwin | 455/404.2 |
| 7,917,159 B1* | 3/2011 | Westfield | 455/456.4 |
| 2007/0293186 A1* | 12/2007 | Lehmann | 455/404.2 |
| 2008/0045250 A1* | 2/2008 | Hwang | 455/466 |
| 2011/0015971 A1* | 1/2011 | Hembury | 705/13 |
| 2012/0302232 A1* | 11/2012 | Rosenblatt et al. | 455/432.1 |

* cited by examiner

*Primary Examiner* — Inder Mehra
(74) *Attorney, Agent, or Firm* — Steve Roedev Esq.

(57) ABSTRACT

A cellular communication network has a mobile switching center (MSC) that maintains a GPS location data of a mobile handset referenced by a mobile identification number (MIN) and an electronic serial number (ESN) in addition to a geographic cell number in an HLR database for handsets operating in the network. The GPS location data of the handset may be used for efficient paging to a specific cell to route incoming calls to the handset, route emergency responder calls with the physical location of the handset and to program the handset with the handset transmission strength to the nearest cell tower In lieu of using triangulation algorithm.

20 Claims, 18 Drawing Sheets

Routing logic 90 for Processing In coming Calls

Process incoming call for routing — 91

Parse destination number and Check in HLR — 92

Find last known cell id — 93

Retrieve GPS Location from HLR database — 94

Compute exact cell id from GPS location — 95

Send page command to the specific cell Id — 96

Wait for page response — 97

Set up call data — 98

Route Call to the identified cell towers — 99

Figure 5B

MSC Logic 100 for Processing 911 In coming Call

Process incoming call for routing    101

Retrieve GPS Location from HLR database    102

Convert to Physical address    103

Create a text message with the address and send to emergency system.    104

Perform text to speech conversion of physical address    105

Embed physical address in voice call    106

Route Call    107

Figure 6D

| |
|---|
| At step 120, maintaining in a mobile switching center (MSC) of a cellular communication network, a GPS location data of a mobile handset, referenced by a mobile identification number (MIN) and an electronic serial number (ESN), in addition to a geographic cell number, in an HLR database for the handsets, operating in the network. |
| At step 122, retrieving by an emergency responder logic in the MSC, for a received 911 emergency call, the GPS location data of the handset, from the HLR database, and converting the GPS physical data to a physical address, and sending a text message with the physical address to an emergency response system. |
| At step 124, retrieving by the emergency responder logic in the MSC, for a received 911 emergency call, the GPS location data of the handset from the HLR database, and converting the GPS location data to a physical address, performing a text to speech conversion of the physical address and embedding in the voice call before routing the call to the emergency response system. |
| At step 126, routing by the MSC, a received call, by paging a handset only in the cell location identified by the GPS location data. |
| At step 128, sending by the network to the handset, a handset transmission signal strength, based on the distance of the GPS location of the handset from the cell towers in the cell area in lieu of performing a triangulation logic. |
| At step 130, receiving and processing by the network a R-R record that contains GPS location data and stores GPS location data in the HLR database. |
| At step 132, programming the handset operating as part of the network to include GPS location data as part of a R-R transmission record. |
| At step 134, programming the handset, operating as part of the network, to update its GPS location data when the handset has moved more than 100 feet. |

Figure 8

SYSTEM AND METHOD FOR A CELLULAR COMMUNICATION NETWORKS ORIGINATED 911 CALL EMERGENCY RESPONSE SYSTEM

CROSS REFERENCE

This application claims priority from Provisional Application Ser. No. 61/612,889, filed Mar. 19, 2012 of Tara Chand Singhal, titled, "System and Method for Efficient Operation of Cellular Communication Networks".

This application is related to and claims priority from Provisional Application Ser. No. 61/631,527, filed Jan. 5, 2012 of Tara Chand Singhal, titled, "A System Using GPS to Enhance Battery Life in Handheld Wireless Mobile Devices".

FIELD OF THE INVENTION

A system using GPS location of cell phone devices to improve the operation of cellular communication networks is described. The system uses cell phone devices that use Registration-Request Signal transmission from the cell phone device to convey GPS location of the device to the wireless network.

BACKGROUND

Cellular communication networks operate with and have cell phone devices, sometimes called handsets, cell towers, base stations, mobile switching center (MSC), with access to home location record (HLR) database that maintain subscriber data including their present location by a geographic cell number. The handsets communicate to the network via the cell towers on control and data channels. Networks detect registration-request (R-R) signals on the control channel from the handset and record in the HLR database the presence of the handset in the cell the handset sent the R-R signal from.

The operation of cellular network depends on knowing the general location of the handset in a group of cells to page the handset in those contiguous cell areas and route a call to the given cell area from which the handset responds to the page. That general location of the handset in the HLR database requires the MSC to page a handset in multiple cells based on last known area.

Cellular networks rely on a technique known as triangulation based on signal strength from the handset at a minimum of three different cell towers. The measured received signal strength is used for computing a location of the handset in the cell space using a triangulation algorithm. This approach of triangulation to determine the physical location of the handset within a cell space is used for both battery management in the handset and also used for 911 emergency calls to provide a location of the handset to the emergency responders as required by a 911 federal mandate.

Almost all handsets now come equipped with and have GPS functionality. Many commercial enterprises have figured out ways to use the GPS functionality in the handsets for marketing purposes. It is believed that the same GPS functionality in handsets may be used in a number of different ways to improve the operation of the cellular communication networks.

Hence, it is an objective of the embodiments herein to provide for systems and methods to improve operation of cellular networks using GPS functionality that is already embedded in the handsets/cell phone devices.

SUMMARY

In the prior art landline based telephone system, the telephone company always knew of the physical location of a call originated on a landline telephone device. With the advent of the cellular wireless network and the cell phone devices that operate with such a wireless network that is not possible as the cell phone device is mobile and may be in any location in a geographic area.

The embodiments described herein enable the wireless networks to maintain a precise location of the cell phone devices at all the times. Such embodiments are useful for many purposes, not the least of which is to route 911 emergency calls originating via the mobile cell phone device. The other purpose is to provide an efficient operation of the wireless cellular network then that has been possible in the prior art cellular telephone networks.

Before providing a summary of the embodiments herein, the operation of a cellular telephone network is described in a tutorial manner, which it is believed, would help a reader better understand the embodiments described herein. In the content that follows, the terms handset, cell phone, cell phone device, and device have been used interchangeably.

In a cellular telephone network, geographic space over which cellular service is provided is partitioned in to a large number of geographic cells. Each geographic cell is about a few square miles and is covered by multiple cellular tower antennas. Coverage of a cell area by three towers is preferred, as the three cell towers by measuring the relative strength of the cell phone transmission and by using triangulation can determine the location of the cell phone within the cell space.

This location of the cell phone within the cell itself is not required for the cellular telephone network operation itself. However, the cellular network may use this location information of the cell phone within the geographic cell for purposes other than cellular network operation. One such purpose is to support a federal 911 mandate. Other such purpose is to reduce the transmission power of the cell phone based on distance to the nearest tower to minimize battery usage and thus enhance battery life.

The cell phones are mobile and based on the cell phone owner's life style and vocation a cell phone may move within a cell space, not move at all, or move rapidly across many cells such as when the cell phone owner is in a vehicle in motion or is in a flight. Thus the cell phones may therefore either not change their cell location or change their cell location slowly, or change rapidly and unpredictably. Therefore, as part of the cellular telephone network operation, it is necessary for the cellular network to know in which specific geographic cell the cell phone is physically located at any given time.

To provide that specific geographic cell location information to the cellular network, cell phones have been designed to periodically broadcast an identity signal, called Registration-Request Signal (RRS) that is used by the cellular network to determine and then save the geographic cell location of a wireless mobile cell phone in a network database. The network database is maintained by the cellular carrier and is referenced to and used for routing incoming calls to the specific cell where the cell phone is located.

Based on the speed and unpredictable nature with which a cell phone may move and thus potentially cross geographic boundary of a cell space, the Registration-Request Signal (RRS) is broadcast by the cell phone every few seconds. The RRS should not be confused with the roaming and roaming signal which uses the same Registration-Request Signal in a cell phone to operate in a cellular carrier area that is not covered by the home carrier with which the cell phone owner has contracted for the cell telephone service.

The location of the cell phone in a specific cell that is maintained in the network database is used to route incoming calls to the geographic cell where the cell phone is located.

These incoming calls may originate in any part of the landline and cellular network nationally or globally.

Two different aspects of the efficient cellular network operation technology are described herein. The first of these aspects minimizes or suppresses the transmission of the R-R Signal from the cell phone device when the cell phone has not moved more than 100 feet from an immediate prior location. The second aspect is that the R-R Signal transmission embeds the GPS location data of the cell phone device.

Both of these aspects are capable of independent operation of each other. First of these aspects has been described earlier in another pending application of the applicant as a means to economize on the battery life of the cell phone device. Both of these aspects of technology working together provide for a more efficient cellular network operation as described in the embodiments herein. The first as well as the second of these aspects and their benefits are described in detail in this application.

The cellular network uses these Registration-Request Signals from the devices to record and maintain in a database the current cell location of the device. The database is used to determine the current cell location of the device so that the incoming calls are routed to the specific cell where the device is located based on the Registration-Request Signals being transmitted from the device to the network.

It is not easy to predict when the cell phone of an individual user would move and if it does move how much does it move relative to a cell space, as that would be a function of the life style and cell phone use characteristics of an individual. Further, it is not easy to predict when the cell phone would move in a vehicle requiring constant transmissions of the Registration-Request Signal, as currently provided in the prior art technology. The location of the cell phone would change rapidly based on the speed of the vehicle.

The embodiments described herein provide a Registration-Request Signal Transmission Management (RRSTM) logic that would manage and optimize the Registration-Request Signal transmissions from the cell phone device based on the individual user behavior of using a cell phone. That is, determine when the cell phone has moved and how much it has moved relative to a geographic cell and use that information to either not suppress prior art Registration-Request Signal transmissions or suppress such prior art Registration-Request Signal transmissions.

Dynamically adjusting the rate of Registration-Request Signal transmission that is made possible by the RRSTM logic does not affect the cellular operation of the cell phone as any use of the cell phone is not affected by dynamically adjusting the Registration-Request Signal transmission as had been described above. The prior art Registration-Request Signal transmissions work independently of the actual use of a cell phone for receiving and initiating calls to other phones.

A cell phone working in conjunction with a cellular network uses control channels and data channels. The control channel is used for communicating and exchanging control data such as RR signal and to communicate voice/data channels to be used for a given voice/data connection. Hence the use of the control channel for RR signal does not affect the operation of the cell phone in sending and receiving voice and data transmissions.

As described in the embodiments herein, the R-R logic in handsets is modified to include a current GPS location data of the cell phone device in the R-R record. The wireless network from the received R-R record retrieves the GPS location data of the cell phone devices and saves in the HLR database. By modifying the R-R logic to embed GPS location data, the HLR database is able to maintain such location data in the HLR database.

Maintaining such GPS location data in the HLR database provides multiple benefits for improving the operation of the wireless networks. One of these benefits is that of accurate paging of the cell phones for routing incoming calls. Another of these benefits is to be able to provide for wireless network originated 911 calls, the seamless location of the cell phone device to emergency responders. Yet another benefit may also be to calibrate the device's signal transmission strength in lieu of using triangulation algorithms that are used in prior art.

These and other aspects of the embodiments herein are further described in detail with the help of the accompanying drawings and the description, where similar number are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 5A and 5B are logic block diagrams for the mobile switching center (MSC) that illustrate operation of one the features of the embodiments herein that of accurate paging of cell phone;

FIGS. 6A, 6B, 6C, and 6D are block diagrams for the mobile switching center (MSC) and the Emergency Response System that illustrate operation of one the features of the embodiments herein that of routing a 911 emergency call;

FIG. 8 is method diagram for using GPS data of the cell phone device in the operation of the cellular communication networks.

DESCRIPTION

Introduction

Figure 1:
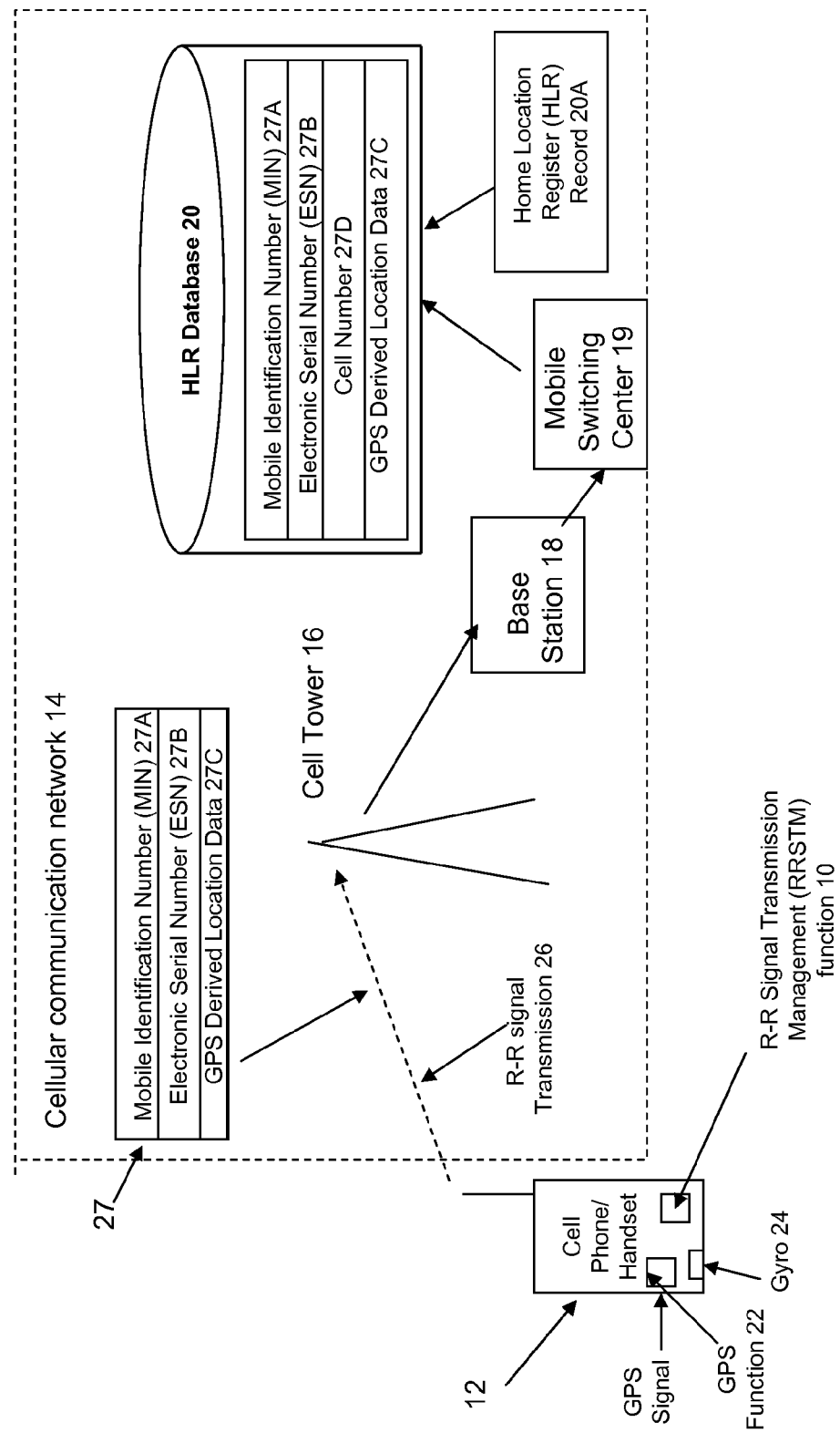
FIG. 1 is a block diagram that illustrates the features of GPS location data in the operation of the cellular communication network.

As illustrated with reference to FIG. 1, a cellular communication network 14 has cell towers 16, a base station 18, and a mobile switching center (MSC) 19 working in conjunction with a HLR database 20. The network 14 via the cell towers 16 communicates with handsets 12 that are part of the operation of the cellular communication network 14.

The handset 12 has GPS function 22, optionally a Gyro function 24 and an R-R Signal Transmission management function 10.

The registration request signal transmission management (RRSTM) function 10 embeds the handset location data from the GPS function 22 as part of the R-R signal 26 so that the record 27 that is transmitted over the control channel from the handset 12 has in addition to mobile identity number MIN 27A, electronic serial number ESN 27B, the global positioning system GPS location data 27C.

The MSC 19 receives R-R signals 26 from handsets 12 that contain in the record 27, in addition to MIN 27A and ESN 27B, the GPS location data 27C. The MSC 19 uses this data to maintain a HLR database 20. The HLR database 20 maintains a GPS location data 27C of a mobile handset 12 referenced by a mobile identification number (MIN) 27A and a electronic serial number (ESN) 27B in addition to a geographic cell number 27D in an HLR database 20 for handsets 12 operating in the network 14. The HLR database many also store other subscriber data including privileges and account standing.

Figure 2A:
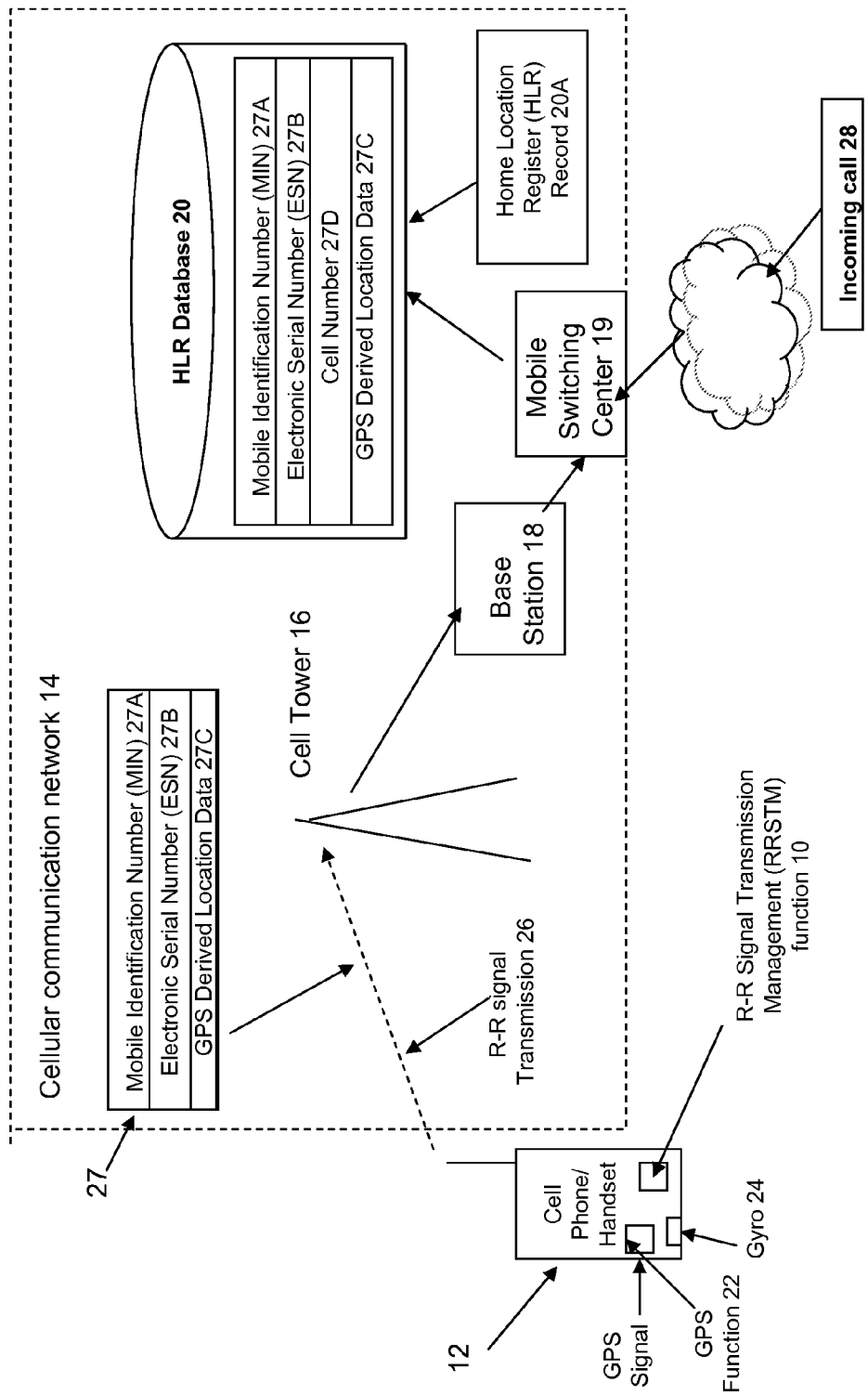
FIG. 2A is a block diagram that illustrates features of the benefits of GPS data in precise paging in the operation of networks.

As illustrated with reference to FIG. 2A, the GPS location data 27C in the HLR database 20 may be used for more efficient paging to the handset 12 to route an incoming call 28 to the handset 12.

Figure 2B:
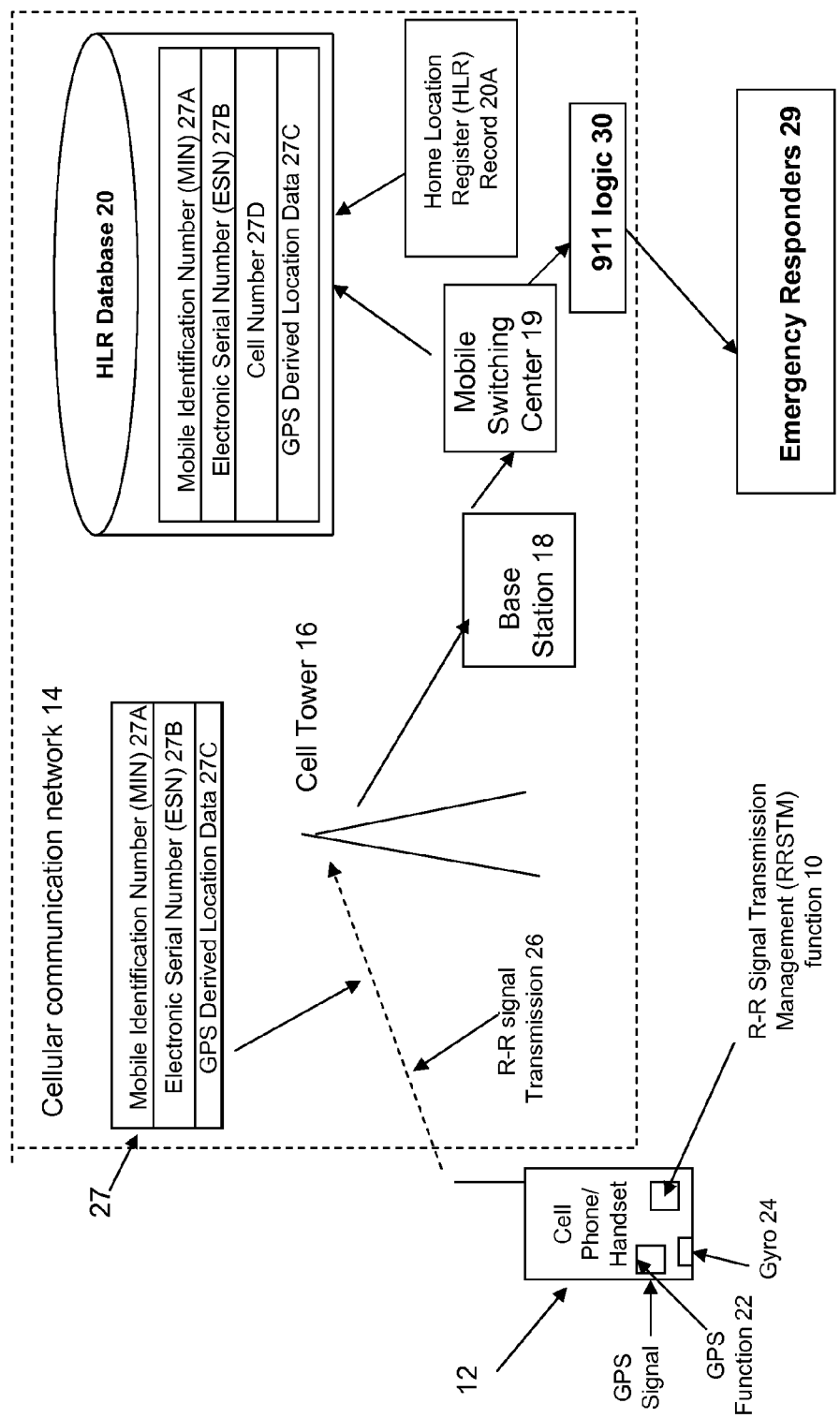
FIG. 2B is a block diagram that illustrates features of the benefits of GPS data for emergency responders.

As illustrated in FIG. 2B, the GPS location data 27C in the HLR database 20 may also be used for more efficient response to the emergency responders 29 via a 911 logic 30 that may operate in the MSC 19 or preferably may operate in a separate server attached or interfaced to the MSC 19.

Figure 2C:
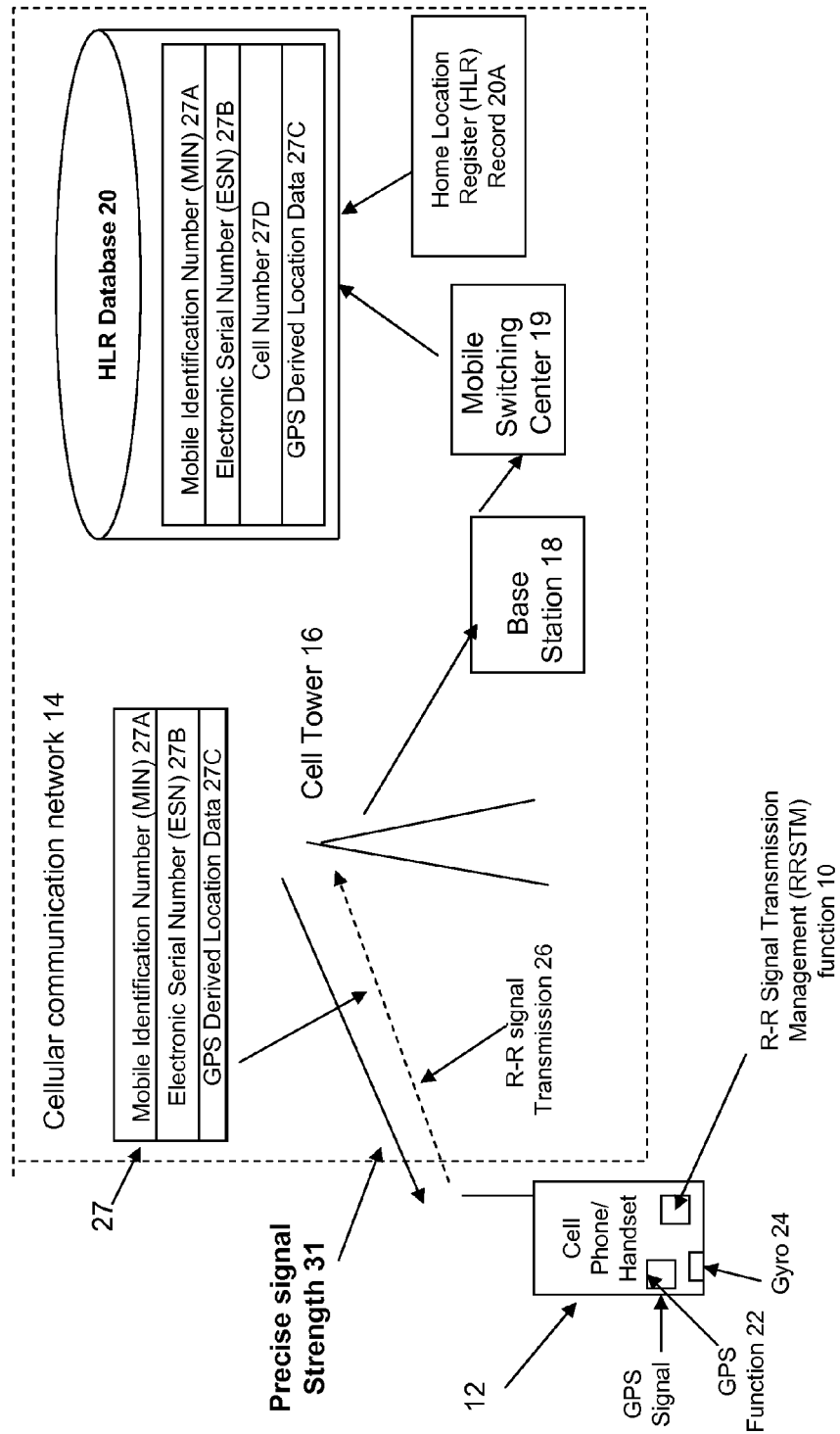
FIG. 2C is a block diagram that illustrates features of the benefits of GPS data in computing a precise handset transmission signal strength in the operation of handsets of the networks.

As illustrated in FIG. 2C, the GPS location data 27C in the HLR database 20 may also be used to program the handsets 12 with the handset transmission signal strength 31 based on the handset's relative location to the cell towers 16, in lieu of prior art triangulation algorithms.

Figure 3A:
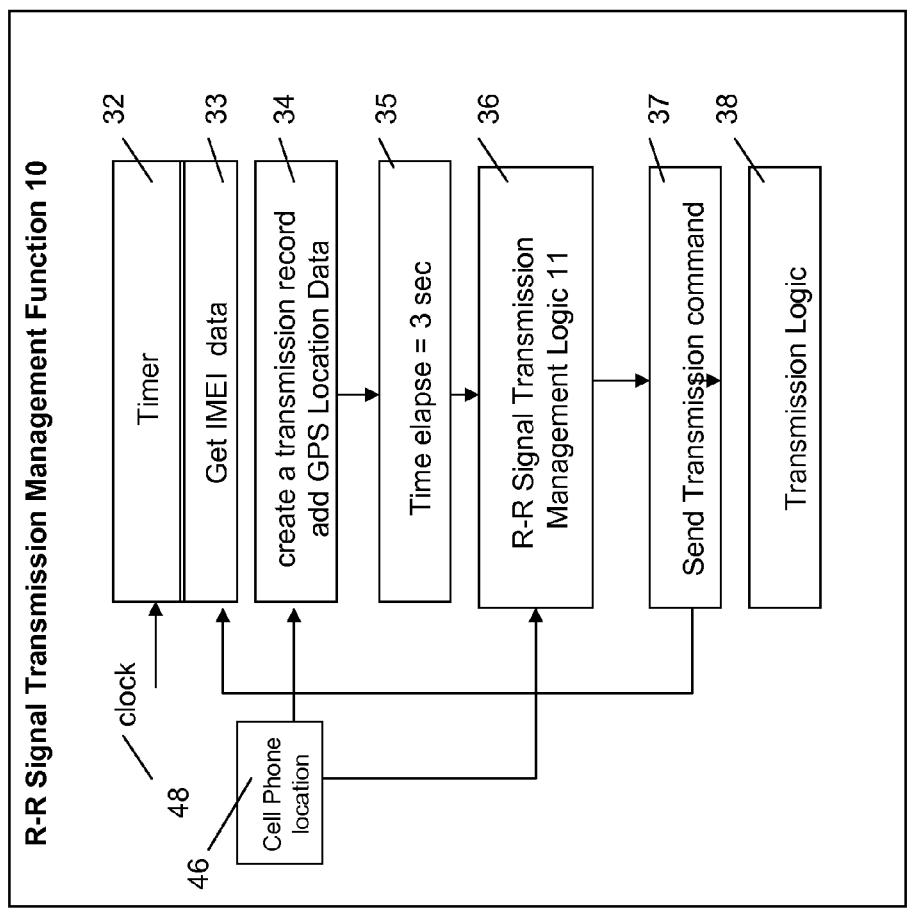
FIGS. 3A and 3B, are block diagrams that illustrate features of different embodiments of using GPS data in the Registration-Request Signal Transmission Management logic.
Figure 3B:
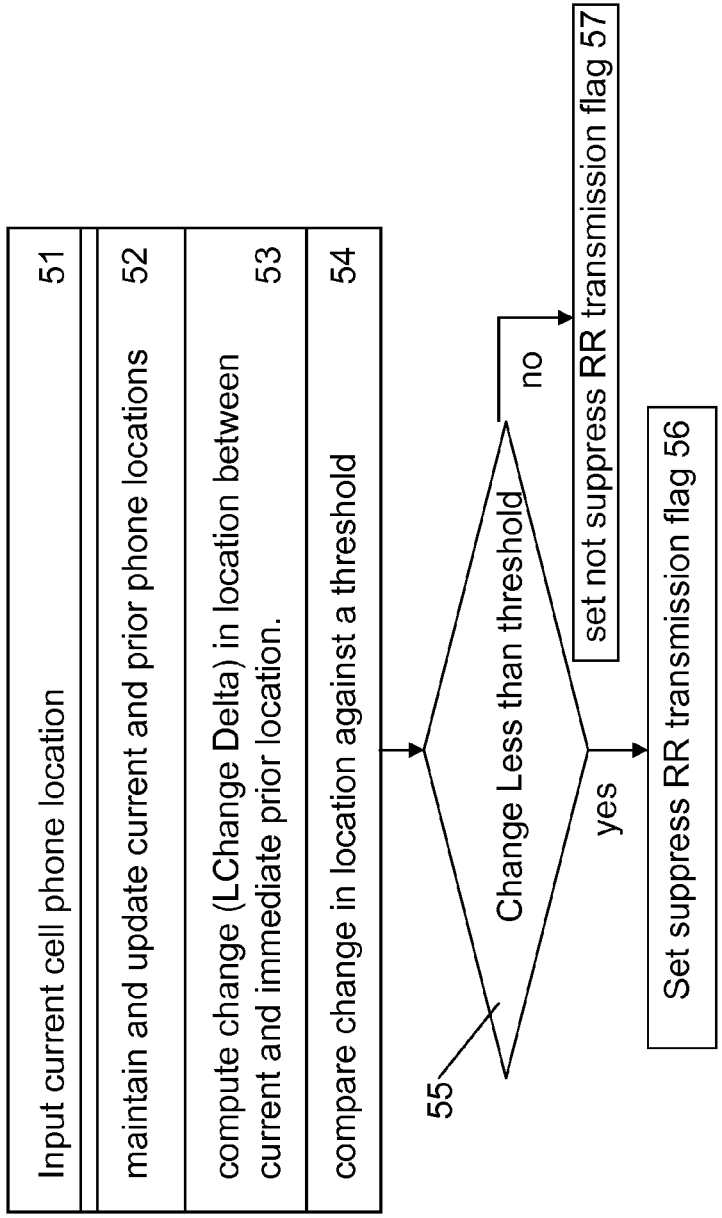

FIGS. 3A and 3B illustrate the operation of the RRSTM and how the R-R signal transmission logic in the handset is used to embed GPS location data.

Figure 4A:
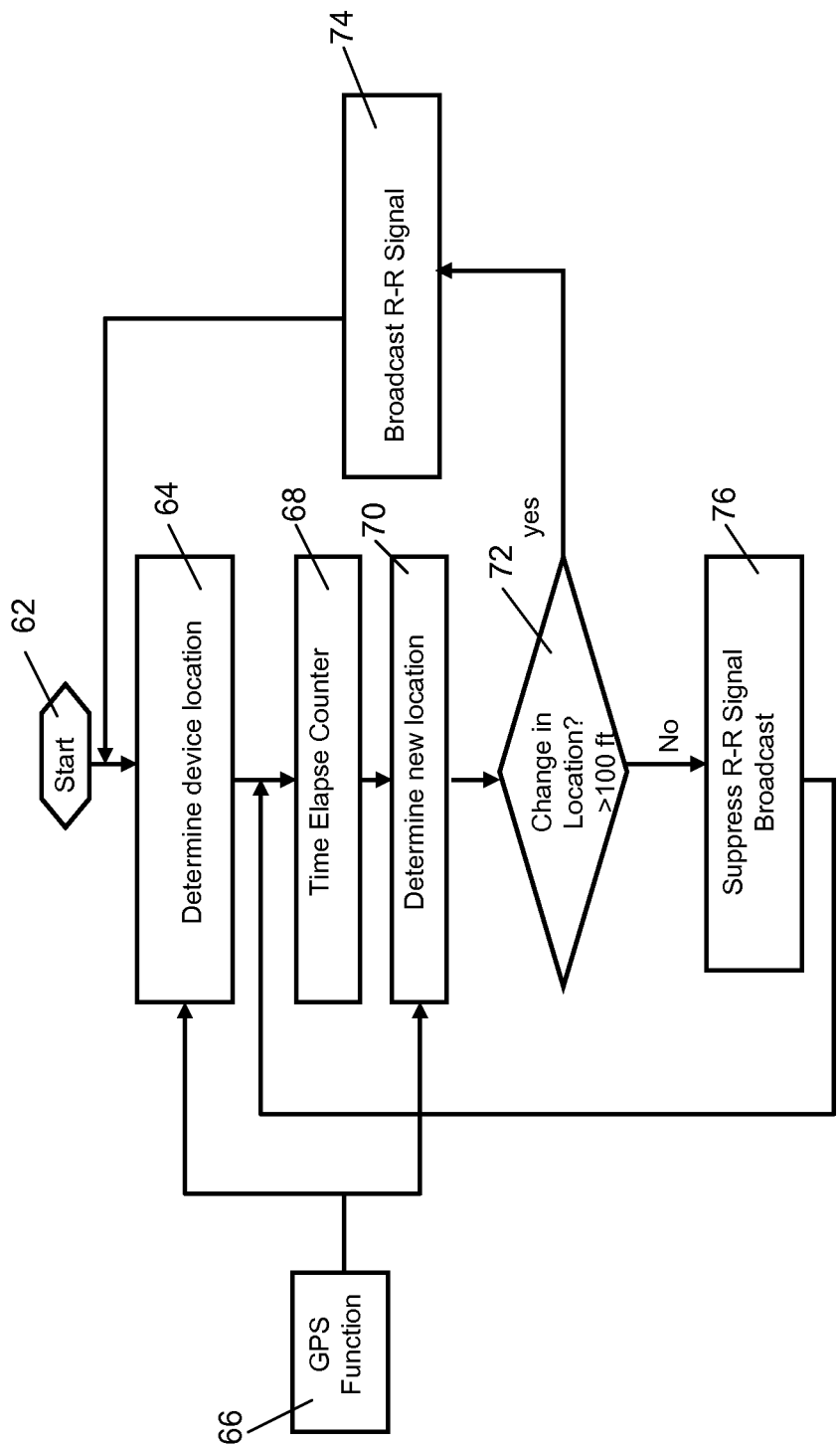
FIGS. 4A and 4B are logic block diagrams that illustrate operation of the R-R Signal management function.
Figure 4B:
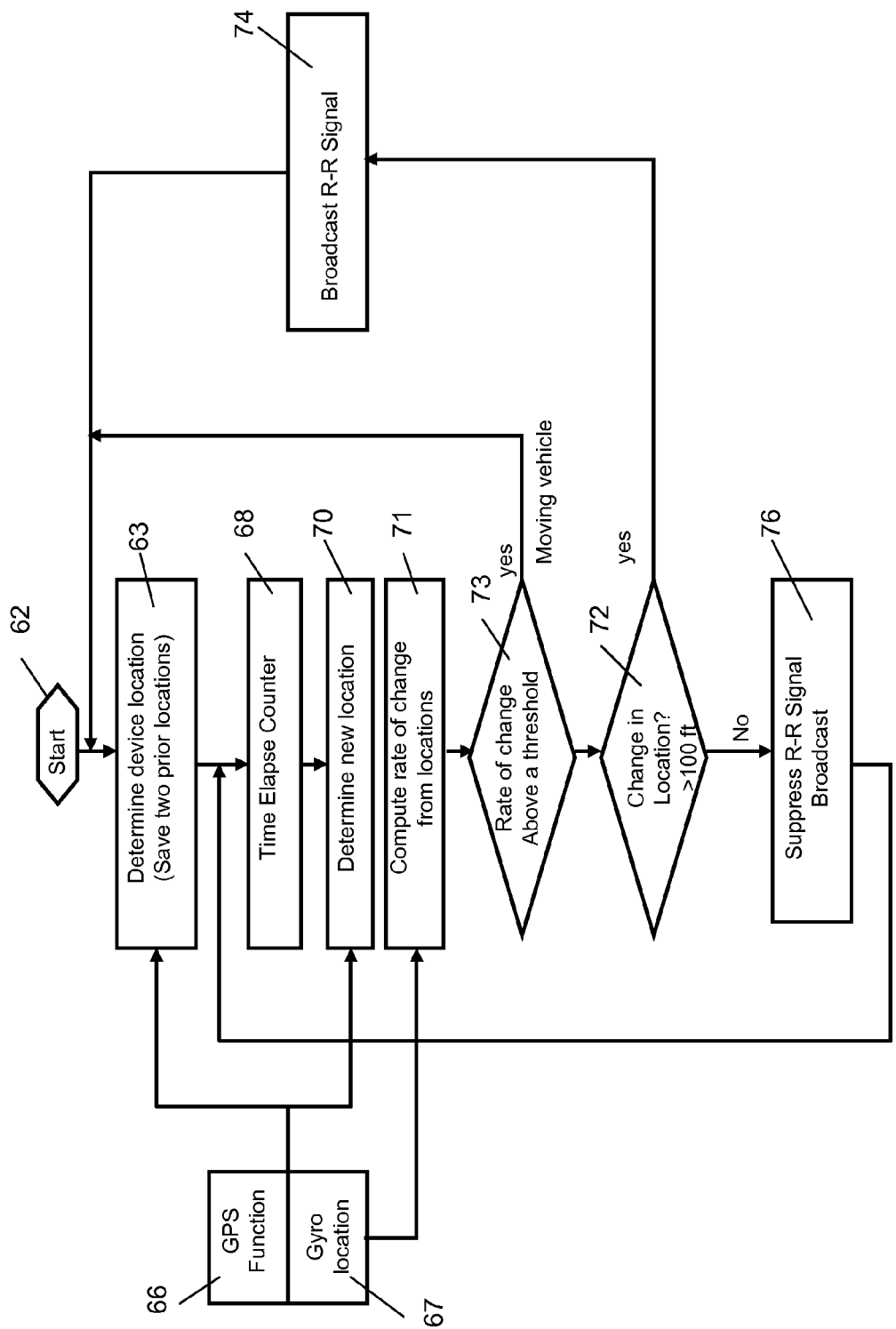

FIGS. 4A and 4B illustrate how the R-R signal management function logic keeps track of handset movements and suppresses R-R transmissions when the handset 12 has not physically changed its position more than 100 feet.

Figure 4C:
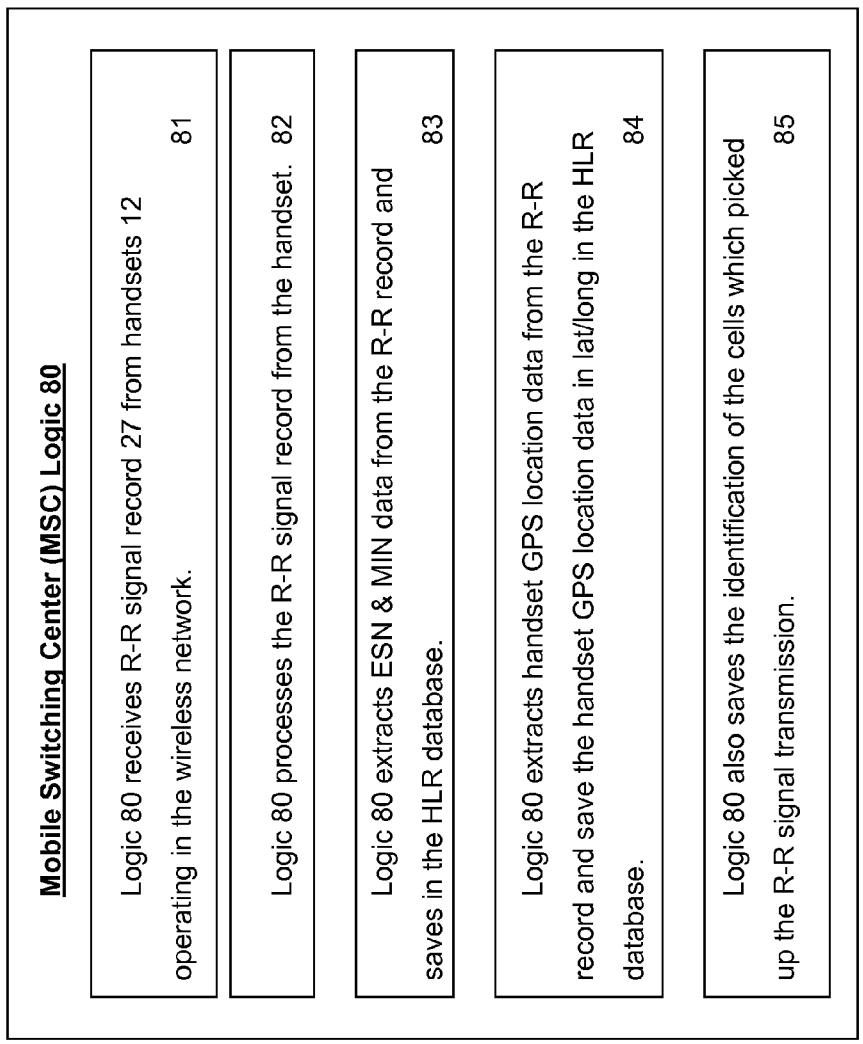
FIG. 4C is a block diagram that illustrates features of the logic operating in the mobile switching center for retrieving the device GPS location data from a received R-R signal and saving the same in the HLR database.

As illustrated with reference to FIG. 4C, the MSC 19 of the network 14 receives and processes an R-R record 27 from the handset 12 that contains GPS location data 27C and stores GPS location data 27C in the HLR database 20.

Figure 5A:
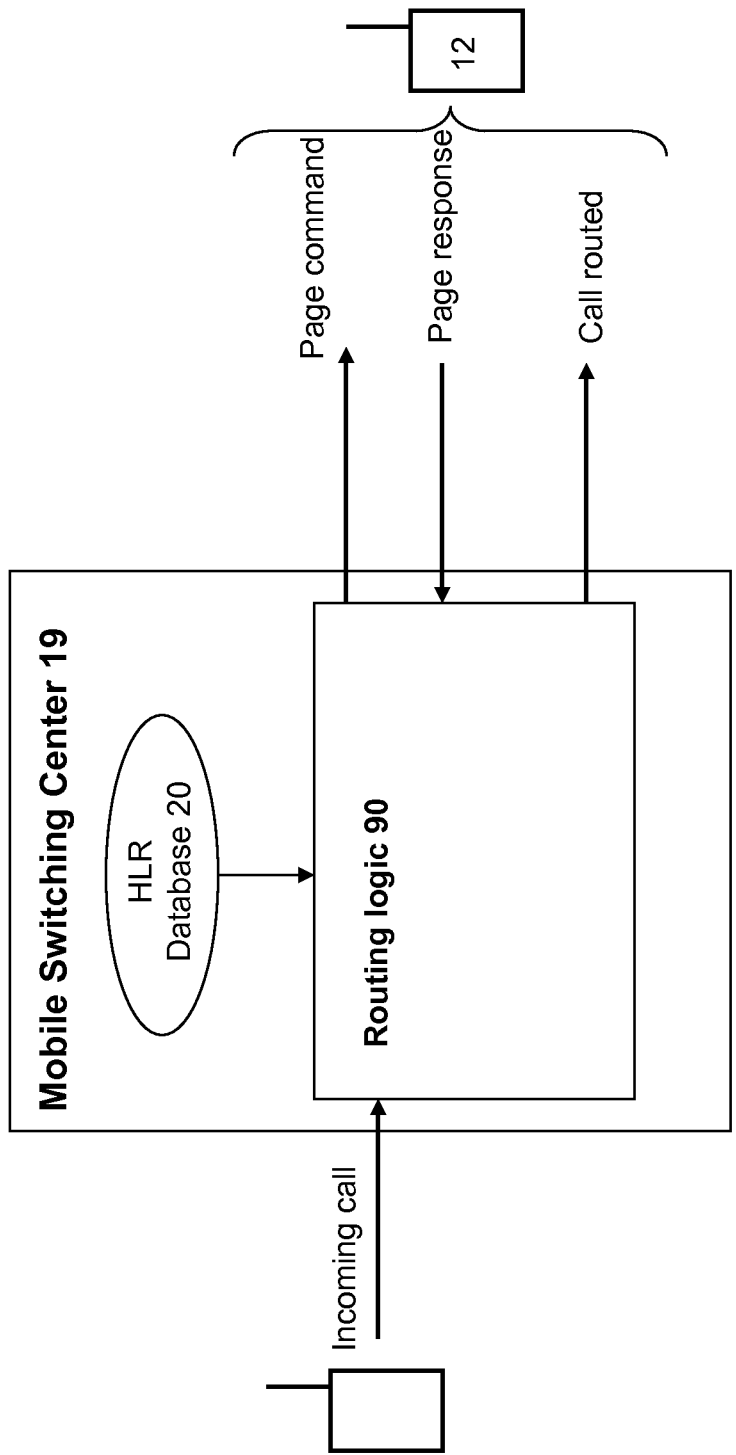

FIGS. 5A and 5B illustrate operation of the logic in the MSC 19 that makes use of the GPS location data in the HLR database 20 for accurate paging of the cell phones for routing incoming calls.

FIGS. 6A, 6B, 6C, and 6D illustrate operation of a 911 emergency call routing system for 911 calls originating in the wireless network.

Figure 7A:
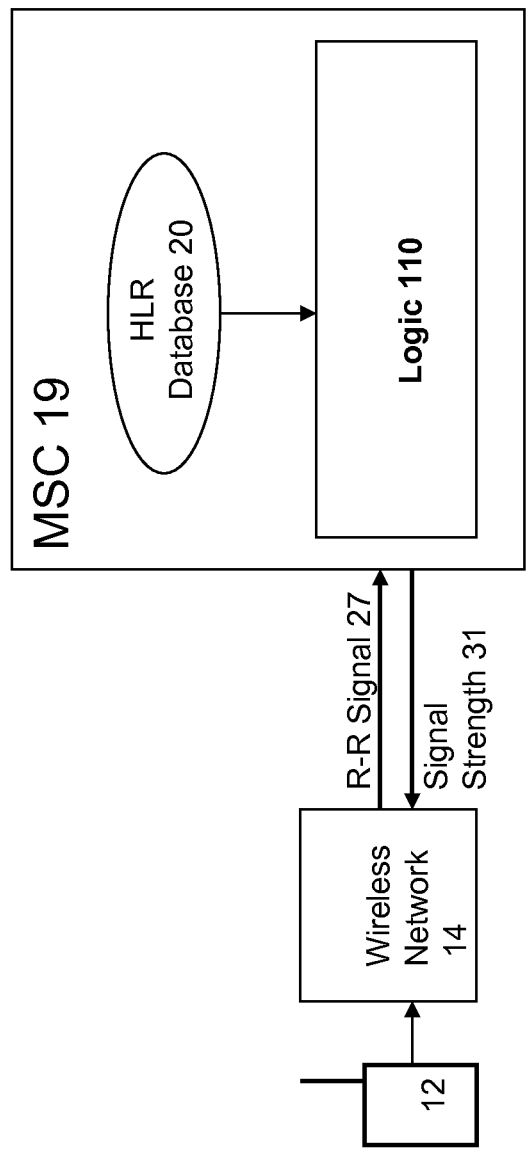
FIGS. 7A and 7B are logic block diagrams for the mobile switching center (MSC) that illustrate operation of one the features of the embodiments herein that of computing device's signal transmission strength.
Figure 7B:
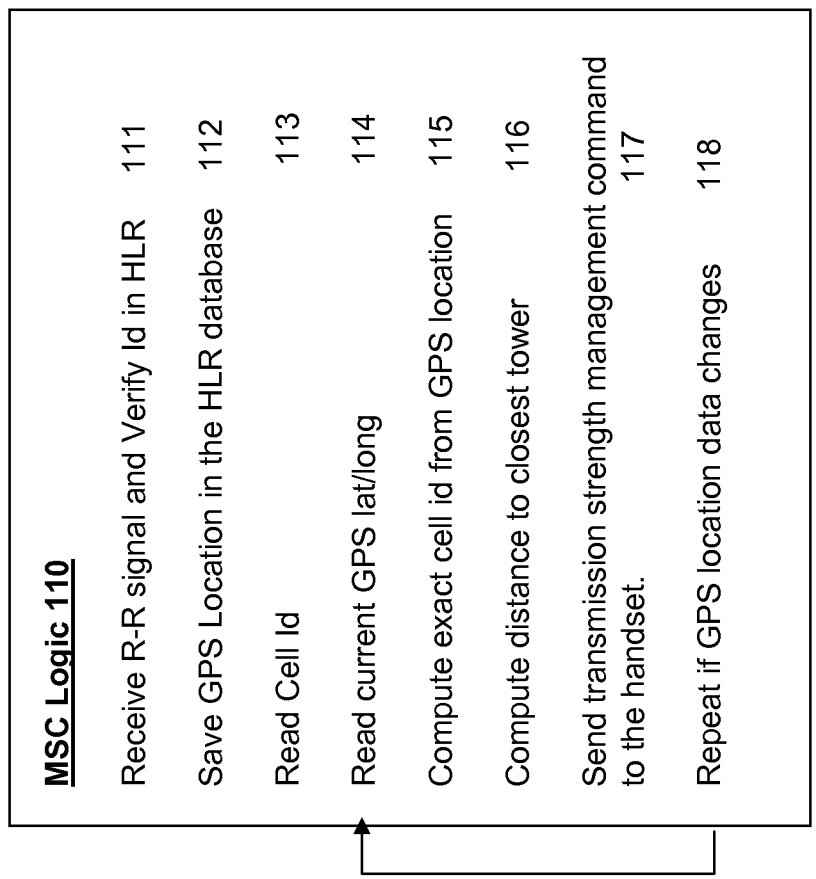

FIGS. 7A and 7B illustrate operation of the logic in the MSC 19 that makes use of the GPS location data in the HLR database 20 for accurate computing of the device's signal transmission strength to enhance device battery life in lieu of prior art triangulation approach.

It is up to the cellular network carrier which one of these features described herein to use and not use to enhance the operation of the network. There may be more or different features and applications that may be supported by the HLR database and these are not ruled out. While some of these functions may be used to improve the operational efficiency of the cellular communication networks others may be used to possibly generate additional revenues by providing enhanced services to a number of businesses who may benefit from knowing the location of the network subscribers.

FIG. 8 is a method diagram of the operation of the cellular communication network with the features of the embodiments herein. These and other aspects of the embodiments herein are described in detail, where the headings are provided for reader convenience.

Registration-Request Signal Transmission Management Function 10

FIG. 3A illustrates the RRSTM function 10. There is a timer function 30 that is driven by a clock signal 48. Part of the phone logic keeps phone identification data called IMEI. A function 32 gets the IMEI data. A function 33 creates a transmission record using the IMEI data. The function 34 also gets and embeds the GPS location data. A function 35 then checks the timer to see if the time elapsed in equal five seconds. If the time elapsed in five seconds, the RRSTM logic 11 is activated. The details of the logic 11 are described with respect to FIG. 3B. The RRSTM logic 36 requires input of cell phone location 46. When the logic returns from the RRSTM logic 11, the function 37 to send transmission command is executed. The function 38 executes the transmission logic.

FIG. 3B illustrates the functions of the RRSTM logic 11. These functions are (i) set up and run an elapsed time timer, 50 (ii) Input/receive cell phone locations at every elapsed time interval 52, (iii) compute change in location (LChangeDelta) between current and immediate prior location 54, (iv) compare change in location (LChangeDelta) is less than a threshold 56, (v) if yes the Registration-Request message transmission is suppressed 58, If no, go to input cell phone location for the next loop 60.

As illustrated in FIG. 4A, the logic has the basic steps as illustrated. In this basic logic, the cell phone location as determined by GPS function may be sufficient for the operation of the RRSTM logic. The steps are self explanatory as follows. The logic starts 62. At step 64, the device location with the help of GPS function 66 is determined. At step 68, time elapsed counter is checked. At step 70 the new location of the device with the help of GPS function 66 is determined. At step 72, if the change in two locations is determined and if the change is greater than 100 feet, then at step 74, the RR signal is broadcast or its broadcast is not suppressed. If the change is less than 100 feet, then the broadcast of the RR signal is suppressed by looping back to step 64 to begin a new loop.

The global positioning satellite (GPS) system for commercial applications may not provide a location precision that is less than 100 feet change is location. The figure of 100 feet in step 72 is used as an illustration to illustrate how the logic works. The figure 100 feet may be any number that represents a threshold for the change in location for which the RR broadcast is either suppressed or not suppressed. The figure of 100 feet may be chosen to represent a threshold that the device has not moved at all from its present location for the purposes of the RR logic. Further a GPS provided location resolution to 100 feet of the cell phone device may be considered adequate for emergency response system as well as other applications.

As illustrated in FIG. 4B, the logic has the steps as illustrated. In FIG. 4B, a rate of location change logic steps 71 and 73 have been added that determine if the cell phone is in a vehicle in motion. Further many phones now come equipped with a gyro function 67 that can more precisely determine change is location and that may work in conjunction with the GPS function 66. In that case the logic to suppress Registration-Request Signal transmissions is bypassed and the logic continuously loops to detect a change in the movement of the cell phone.

The system may have a function that computes a rate of change of location and if the rate is above a threshold, indicative of a rapidly moving physical location, the function does not suppress the prior art Registration-Request Signal transmissions to the network.

The system may have a function to detect a previous and a current location of the cell phone device, receives location inputs from a combination of a GPS function and a gyro function in the device to have a more precise cell phone location to compute the change is location and the rate of change in location of the cell phone device.

A system that works in conjunction with a cellular telephone network has a Registration-Request Signal transmission management function that operates in the device and periodically detects change in physical location of the device from an immediate prior location, called an LchangeDelta. The function, if the LchangeDelta keeps the device in a cell space boundary, suppresses a prior art Registration-Request Signal transmission from the device to the cellular network.

The function, if the LchangeDelta moves a device out of the cell boundary, does not suppress the prior art Registration-Request Signal transmission from the device to the cellular network.

Handset 12

The handset 12 operating as part of the network 14 is programmed to include GPS location data as part of an R-R transmission record 27. The handset 12 operating as part of the network 14 is also programmed to update its GPS location data when the handset 12 detects a physical movement in the handset location that exceeds 100 feet from a prior location. These functions of the handset have been described earlier with reference to FIGS. 3A and 3B and also with reference to FIGS. 4A and 4B.

HLR Database 20

As illustrated with reference to FIG. 1, a cellular communication network 14 has a HLR database 20 of a mobile switching center (MSC) 19 of a cellular communication network that maintains a GPS location data 27C of a mobile handset 12. The GPS location data 27C is maintained in the HLR database 20 with reference to a mobile identification number (MIN) 27A and an electronic serial number (ESN) 27B.

The HLR database 20 may be part of the MSC 19. Alternatively, the HLR database 20 may operate independently of the MSC 19 and serve the MSC 19 as well as other applications. On request, the HLR database 20 sends the GPS location data of the handsets to an application.

These applications may include an application that is resident and operating in the MSC 19 itself or the application may be resident and operating in an entity outside of the MSC 19. These applications may include commercial applications that have been contracted for between the commercial and government entities and the cellular network carrier companies.

Mobile Switching Center (MSC) 19 Logic 80

As illustrated with reference to FIG. 4C, the MSC 19 of the network 14 has MSC logic 80. Logic 80 receives and processes an R-R record 27 from the handset 12 that contains GPS location data 27C and stores GPS location data 27C in the HLR database 20.

Logic 80 has the following functions. Function 81 receives R-R signal record 27 from handsets 12 operating in the wireless network. Function 82 processes the R-R signal record from the handset. Function 83 extracts ESN & MIN data from the R-R record and saves in the HLR database. Function 84 extracts handset GPS location data from the R-R record and save the handset GPS location data in lat/long in the HLR database. Function 85 saves the identification of the cells which picked up the R-R signal transmission. Logic 80 functions as described above may be performed in any order and not necessarily the order they are shown in FIG. 4C. The end result of the logic 80 is that the HLR database has the GPS location data of the handset 12, in addition to the data already present in the HLR database as in prior art.

Efficient Device Paging Logic 90

The functions of the efficient paging logic 90 are illustrated with reference to FIGS. 5A and 5B.

As illustrated in FIG. 5A, the routing logic 90 operates in the MSC 19 in conjunction with the HLR database 20 for routing a received incoming call to a called device 12. As part of the routing, the logic 90 first pages by sending a page command in the specific cell where the device 12 is located. The specific cell identification has been determined from the device 12 GPS location data in the HLR database 20. The device 12 responds to the page and the call is routed to the device 12 in that specific cell.

As illustrated in FIG. 5B, the functions of logic 90 are illustrated. Function 91 processes the incoming call for routing. Function 92 parse the destination number of the called device and Check its presence in the HLR database 20.

Function 93, from the HLR database 20, finds the last known cell identifications of the device 12. Function 94 retrieves the GPS Location data of the device 12 from HLR database 20. Function 95 using these data of the last known cell identifications and the current GPS location data in latitude longitude of the device 12 determines the specific cell identification of the device 12. Knowing the device 12's lat/long from the HLR database helps determine the exact and specific cell identification, the device is at the time of the incoming call.

Function 96 send a page command to the specific cell Id. Function 97 waits for page response from the device 12. Function 98 sets up call data. Function 99 routes the incoming call to the identified cell towers in the specific cell.

Emergency Responder Logic 100

The wireless network has emergency-responder logic 100 in the MSC 19. The functions of the logic 100 are illustrated with the help of FIGS. 6A, 6B, 6C and 6D.

Figure 6A:
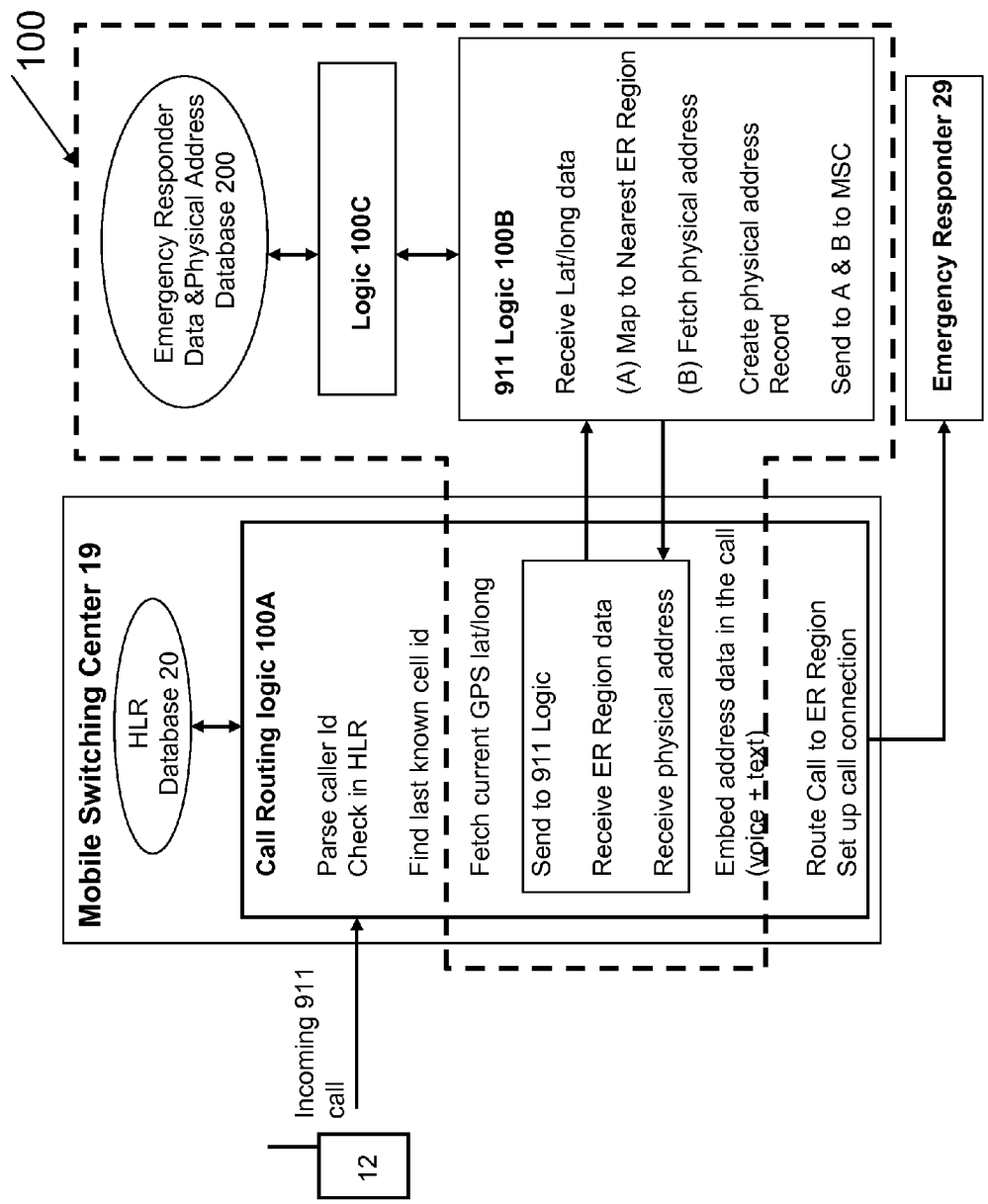

As illustrated with the help of FIG. 6A, the logic 100, as shown by the dotted box has different parts that operate and executes in three different places. The logic 100 operates in (i) as part of the call routing logic 100A, (ii) as part of the 911 logic 100B, (iii) and as logic 100C as part of the emergency responder database 200.

As illustrated in FIG. 6A, the call routing logic 100A, for a received 911 emergency call from the cell phone device 12, parses the caller id and checks for that caller id in the HLR database 20. The logic 100A finds the last known cell area id and retrieves the handset GPS location data from the HLR database 20.

The logic 100A then sends the call control to a 911 logic 100B. The 911 logic 100B may be part of the MSC system by being co-located or may be operative in another location that is accessible by any MSC 19 over the Internet.

The 911 logic 100B works in conjunction with logic 100C that is interfaced with an Emergency Responder Data and Physical Address database 200. The 911 logic 100B receives the latitude longitude data of the calling device 12 and with the help of database 200 maps that location to the nearest ER region. The 911 logic 100B also maps the latitude longitude data to the nearest physical address of the device, again using the database 200.

The logic 100C provides for the search logic and may operate as part of the database servers and provides an interface to the data in the database 200 to search and fetch the ER region data and the physical address data of the device corresponding to a latitude longitude value. Such search logic is considered prior art is used in many prior art applications to search a database.

Logic 100B based on the latitude longitude data of the handset 12 receives via logic 100C two different data sets identified as data set A and data set B. The data set A provides the ER region that would be responsible for handling this emergency response and its landline contact number for routing the 911 call to that landline number. The dataset B provides the actual physical address where the handset 12 is currently located. Logic 100B having received these two data sets A and B format a record and sends the record to the logic 100A.

Then the 911 logic 100B sends both of these data to the logic 100A. The logic 100A then embeds physical address data in the call and routes the 911 call to the Emergency Responder 29 for the ER region and sets up a live call connection between the device and the ER 29.

Figure 6B:
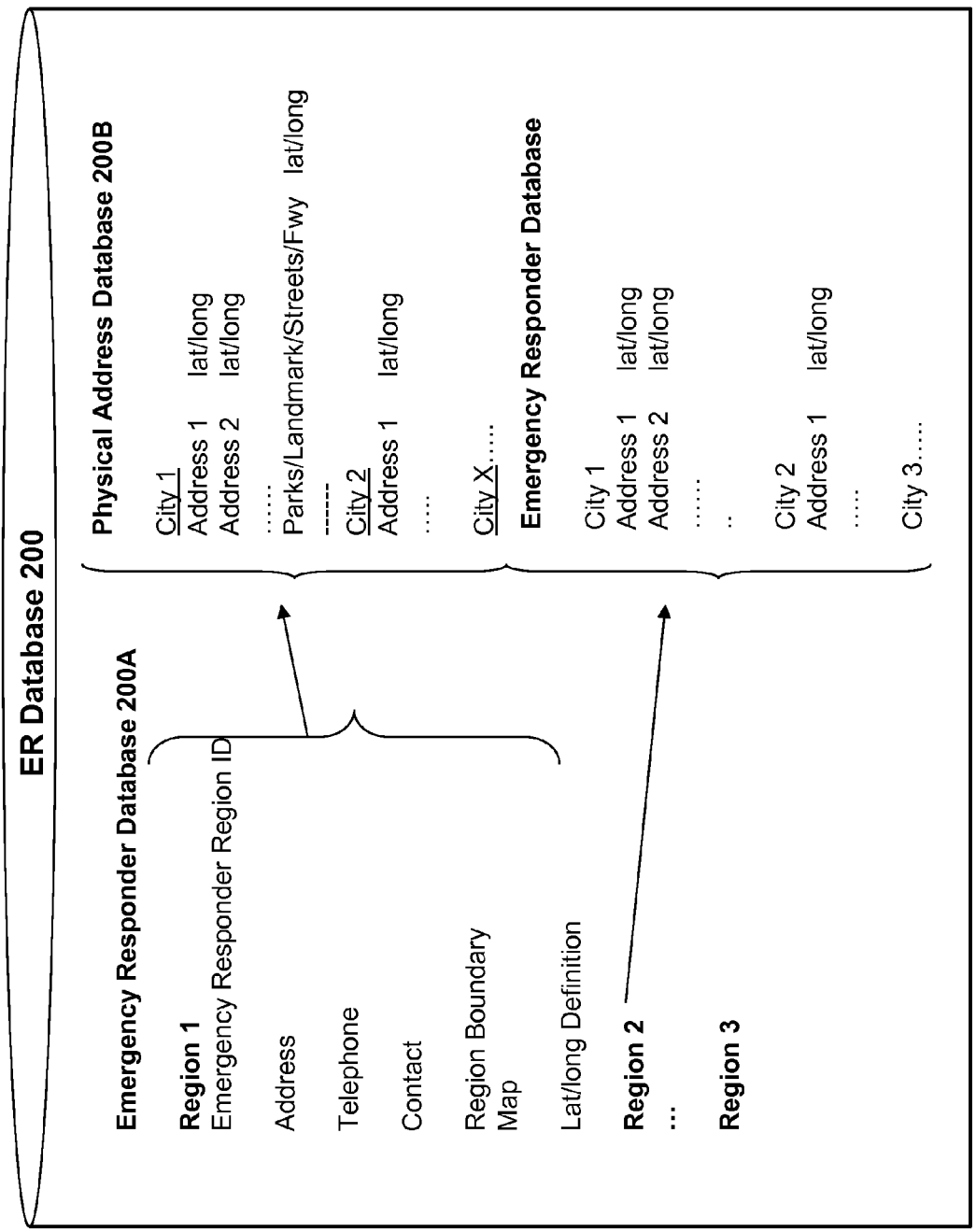

The features of the database 200 are illustrated with the help of FIG. 6B. The database 200 has two different databases 200A and 200B. The database 200A stores the data relate to different ER regions. For each ER region, the database stores regions id, address, telephone, contact, region boundary, map and latitude longitude boundaries. The database 200 is used to map the latitude longitude data of a received 911 call to a specific ER region that would respond to the call. The database 200A sends the landline telephone number of the ER region to the logic 90 for it to route the 911 call to that landline number.

The database 200B identifies the cities of each ER region of database 200A and the physical addresses present in each of these cities and the latitude longitude of each such address. The database 200B also identifies the other parts of the city such as various landmarks, parks, streets, and Freeways.

The database 200B maps a latitude longitude data of a received 911 call to one of these physical addresses.

The database 200 maps the GPS location data to a physical address and, sends a text message with the physical address to the emergency system. The mapping to a physical address from a GPS location data in latitude and longitude dimensions is prior art. The mapping may be done by a tabular look up of the physical addresses that map to the GPS location data.

Figure 6C:
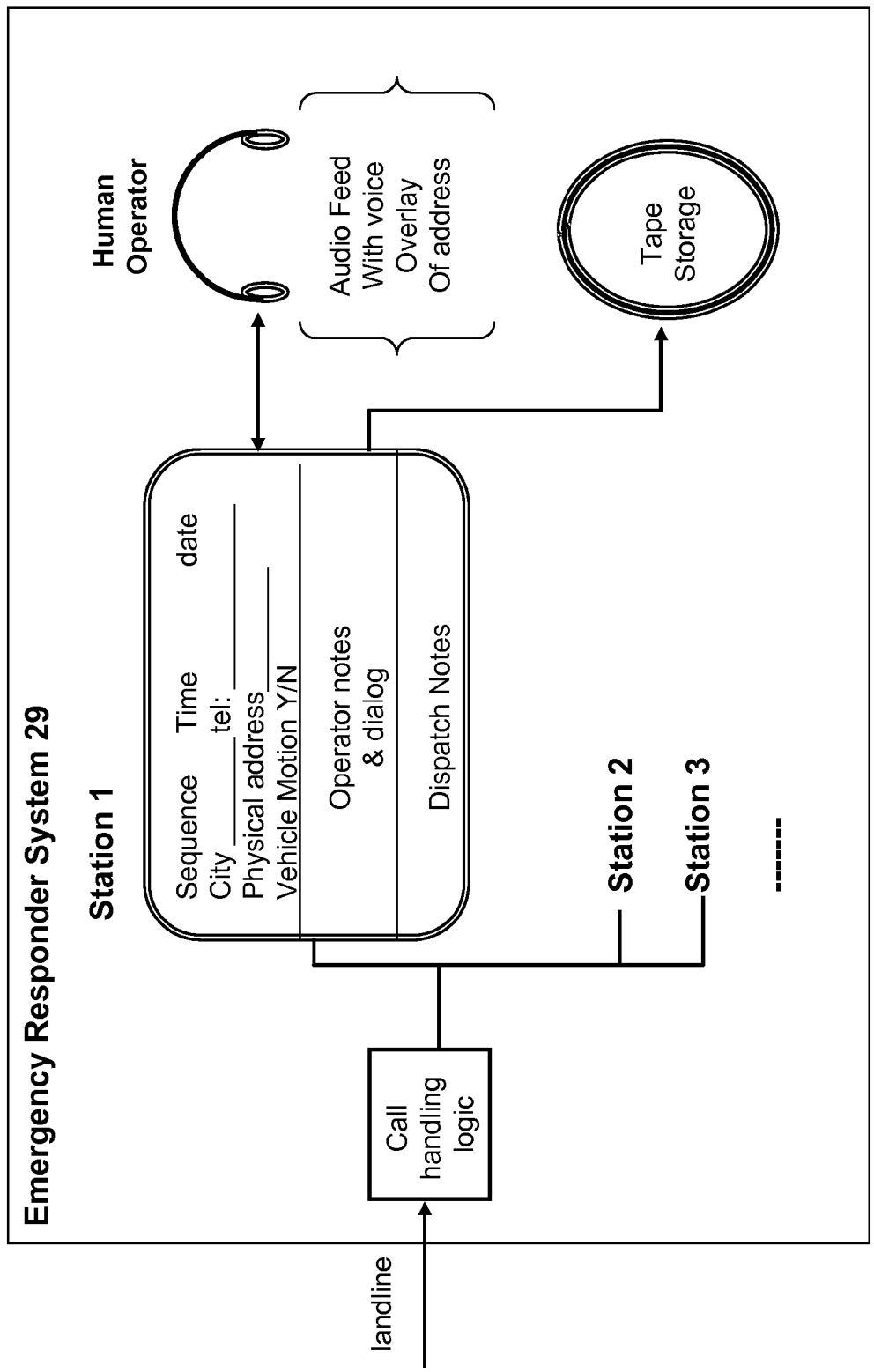

The Emergency Responder System 29 is illustrated with reference to FIG. 6C. What is illustrated is that a incoming 911 call is received by a call handling logic and this logic based on the availability of the Stations routes the call to a particular station manned by an agent.

Each station has a display screen and an audio head phone being used by the agent to receive and respond to the 911 call. The station displays meta data such as sequence time date and also displays city, telephone and the physical address of the calling device for the 911 call. Optionally the 911 logic may also support display of if the cell phone is in a vehicle that is in motion.

The other parts of the display provide for operator notes and dialogue and dispatch notes if any. The 911 meta and dialogue and dispatch/resolution data is appropriately formatted and simultaneously being sent and being recorded on a tape storage. The audio feed as heard on the headphone also overlays the physical address in addition to displaying on the display screen.

FIG. 6D provided a simplified illustration of the different functions of logic 100. Function 101 processes the incoming call for routing. Function 102 retrieves location data from the HLR database. Function 103 converts the latitude longitude data to a physical address. Function 104 creates a text message and sends to the emergency system. Function 105 performs a text to speech conversion of the physical address and function 106 embeds the physical address in the voice call as overlaid audio. Function 107 routes the call the emergency system 29.

The emergency responder logic 100A in the MSC for a received 911 emergency call from the handset 12 retrieves the handset GPS location data 27C from the HLR database 20. The logic 100B maps the GPS location data 27C to a physical address. Logic 100A then performs a text to speech conversion of the physical address. The technologies that support text to speech conversion are prior art. The logic 100A also may have a function that overlays the speech version of the physical address in a routed 911 call to the emergency system 29.

Efficient Device 12 Power Management Logic 110

The functions of the efficient device power management logic 110 are illustrated with reference to FIGS. 7A and 7B.

As illustrated in FIG. 7A, the logic 110 operates in the MSC 19 for computing the device's 12 optimum signal transmission strength based on the location of the device in a given cell area respective to the distance to the nearest cell telephone towers. Logic 110 working in conjunction with the HLR database 10 computes the device 12 optimum signal transmission strength for optimizing battery usage of device 12. Logic 110 receives R-R signal record 27 from the device 12 and sends the precise signal strength 31 to the device 12 via the wireless network 14.

The logic 110 receives an R-R signal transmission from the device, and updates the HLR database with the cell id and the device's GPS location data as had been described earlier with reference to logic 90.

Subsequent to processing the R-R signal as in logic 90, described earlier, the logic 110 reads the current GPS location data of the device and computes the device's transmission signal strength for transmission to the nearest cell tower in the cell area and sends that signal strength to the wireless device over the control channel for the device to store in the device.

This approach it is believed is preferable to computing the device signal transmission strength via prior art triangulation techniques that depends upon the MSC 19 receiving signal from the device at least three cell towers at full power and then based on the relative received signal strength at each cell tower and knowing the geographical placement of each cell tower, to compute the device's location in that cell as well as its distance to the nearest cell tower.

The functions of logic 110 are illustrated with reference to FIG. 7B. As illustrated in FIG. 7B, function 111 receives R-R signal and verifies Id in HLR database 20. Function 112 saves GPS Location data of the device 12 in the HLR database 20. Function 113 reads Cell Identifications of the handset 12 in the database 20. Function 114 reads current GPS lat/long of the device 12. Function 115 computes exact cell id from the GPS location data. Function 116 computes distance of the device 12 to closest cell tower in the specific cell space. Function 117 sends/transmits a signal strength management command to the handset. The function 118 repeats the process if GPS location data of the device 12, in the database has changed signifying movement of the handset 12 relative to the cell towers.

The network 14 sends to the handset 12 a handset transmission signal strength 31, based on the distance of the GPS location of the handset 12 from the cell towers in the cell area in lieu of performing a triangulation logic.

A mobile wireless cell phone device, operating as apart of a wireless communication network has a GPS function. A registration request signal transmission management (RRSTM) logic operating in the cell phone device creates a registration-request (R-R) record and embeds a GPS location data of the device in the record in addition to the international mobility equipment identifier (IMEI) data of the device in the record. The logic sends the R-R record with the GPS location data to the wireless network.

The device receives from the network a device transmission signal strength, as computed by the network based on a distance of the GPS location of the device to the cell towers in the cell area, in lieu of the network performing a triangulation logic to compute the location of the device in the cell area. The device stores the received transmission signal strength and uses that data to calibrate the transmission signal strength of an outgoing voice and data transmission to the network to economize on the battery of the device. The device, operating as part of the wireless network, is programmed to include GPS location data of the device as part of a R-R transmission record to the network.

The device operating as part of the wireless network is programmed to update its GPS location data for inclusion in the R-R record and transmit the R-R record when the device detects a physical movement in the device location that exceeds a threshold equal to 100 feet from a prior location.

A wireless network operating in conjunction with wireless mobile devices, has a mobile switching center (MSC) with a home location record (HLR) database that stores subscriber Id data of cell phone devices that are subscribed to and are operating in the network. The network receives and processes a R-R record from the cell phone devices, the records contains a GPS location data of the devices and the network stores the GPS location data of the devices in the HLR database.

The network sends to the device, a handset transmission signal strength, as computed by the network based on the distance of the GPS location of the handset from the cell towers in the cell area, in lieu of performing a triangulation logic.

The MSC for routing a received call into the network from a calling telephone device to a called cell phone device, pages the called device only in the specific cell location that is mapped from the GPS location data of the device in the HLR database, in lieu of paging all the surrounding cells from a last known cell location of the cell phone device.

A cellular communication network has a HLR database of a mobile switching center (MSC) of a cellular communication network that maintains a GPS location data of a mobile cell phone device. The GPS location data is maintained in the HLR database with reference to a mobile identification number (MIN) and a electronic serial number (ESN). The HLR database, on request received by the network, sends the GPS location data of the device with the device identifier to a system hosting an application. The application may include an application that is resident and operating in the MSC itself or the application may be resident and operating in a system by an entity outside of the MSC.

A cellular communication network based emergency response system, has a mobile switching center (MSC) of a cellular communication network that maintains, in an home location record (HLR) database, a GPS location data of a mobile cell phone device, for devices that are operating in the network. The MSC has an interface to an emergency response (ER) system. The MSC for a received 911 emergency call from a wireless device retrieves the device's GPS location data from the HLR database and sends to the ER system over the interface.

An emergency response logic in the ER system maps the received GPS location data to (i) an ER region contact data from a pre-stored ER region contact database and (ii) maps the GPS location data to a physical address of the device. The logic creates and sends a record with the ER region contact data and the device's physical address data to the MSC over the interface. The MSC receives the record and routes the 911 call to the ER region contact landline. The logic embeds a text/voice message with the physical address of the device or sends a separate text message record.

The MSC for a received 911 emergency call from a device retrieves the device's GPS location data from the HLR database and routs the call with the location data to an ER system.

An emergency responder logic in the ER system, maps the received GPS location data to (i) an ER region contact data and (ii) to a physical address of the device. The logic routs the call to a landline number of the ER region and embeds a text message with the physical address of the handset to the ER region.

An emergency responder logic in the MSC for a received 911 emergency call from the device retrieves the device's GPS location data, maps to a physical address and performs a text to speech conversion of the physical address and embeds the physical address in a routed 911 call to the emergency system.

An emergency response system for a wireless network has a logic that is operable in a server of the emergency response system that receives a lat/long data of a received 911 call, of a cell phone device operating in the wireless network, from a mobile switching center of the wireless network. The logic interfaces with a ER database system, the ER database system maps the lat/long data to a physical address and the logic retrieves the device's physical address from the database.

The logic sends the physical address data to the mobile switching center.

The ER database system also sends to the logic the ER region where the device is located and the landline number of the ER region. The logic sends both the device's physical address and the ER region landline number to the mobile switching center for the mobile switching center, thereby the mobile switching center is able to route the 911 emergency call to the specific ER region where the device is located as well as the physical address of the device.

The ER database system stores the cities in each of the ER regions and the physical addresses in each city along with their lat/long data. The ER database system stores ER region details including address and landline contact numbers. The ER database system stores for each of the cities in each of the ER regions, the landmarks including parks, highways, libraries, points of interest and their physical addresses along with their lat/long data.

Method of Operation

As illustrated with reference to FIG. 8, a method for enhancing the efficiency of a cellular communication network has the following steps where all the steps may not be used or used in the order specified.

At step 120, maintaining in a mobile switching center (MSC) of a cellular communication network, a GPS location data of a mobile handset, referenced by a mobile identification number (MIN) and an electronic serial number (ESN), in addition to a geographic cell number, in an HLR database for the handsets, operating in the network.

At step 122, retrieving by emergency responder logic in the MSC, for a received 911 emergency call, the GPS location data of the handset, from the HLR database, and converting the GPS physical data to a physical address, and sending a text message with the physical address to an emergency response system.

At step 124, retrieving by the emergency responder logic in the MSC, for a received 911 emergency call, the GPS location data of the handset from the HLR database, and converting the GPS location data to a physical address, performing a text to speech conversion of the physical address and embedding in the voice call before routing the call to the emergency response system.

At step 126, routing by the MSC, a received call, by paging a handset only in the cell location identified by the GPS location data.

At step 128, sending by the network to the handset, a handset transmission signal strength, based on the distance of the GPS location of the handset from the cell towers in the cell area in lieu of performing a triangulation logic.

At step 130, receiving and processing by the network an R-R record that contains GPS location data and stores GPS location data in the HLR database.

At step 132, programming the handset operating as part of the network to include GPS location data as part of an R-R transmission record.

At step 134, programming the handset, operating as part of the network, to update its GPS location data when the handset has moved more than 100 feet.

Further detailed method steps are provided as follows.

A method for a mobile wireless cell phone device, operating as apart of a wireless communication network has the following steps, where all the steps may not be used or used in the order specified:

a. having by the cell phone device a GPS function;

b. creating by a registration request signal transmission management (RRSTM) logic, operating in the cell phone device, a registration-request (R-R) record and embedding a GPS location data of the device in the record in addition to a international mobility equipment identifier (IMEI) data of the cell phone device in the record;

c. sending by the logic the R-R record with the GPS location data to the wireless network.

d. receiving by the device from the network a device transmission signal strength, as computed by the network based on a distance of the GPS location of the device to the cell towers in the cell area, in lieu of the network performing a triangulation logic to compute the location of the device.

d. storing by the device the received transmission signal strength and using that data to calibrate the transmission signal strength of an outgoing voice and data transmission to the network and thus economize on the battery of the device.

e. programming the device, operating as part of the wireless network, to include GPS location data as part of a R-R transmission record.

f. programming the device operating as part of the wireless network to update its GPS location data for inclusion in the R-R record and send the R-R record when the device detects a physical movement in the device's location that exceeds 100 feet from a prior location.

A method for a wireless network operating in conjunction with mobile wireless devices has the following steps where all the steps may not be used or used in the order specified:

a. having by the wireless network a mobile switching center (MSC) with a home location record (HLR) database that stores subscriber Id data of cell phone devices that are subscribed to and are operating in the network;

b. receiving and processing by the network a R-R record from the cell phone devices, the records containing a GPS location data of the devices and the network storing the GPS location data of the devices in the HLR database.

c. sending by the network to the device, a device transmission signal strength, as computed by the network based on the distance of the GPS location of the device from the cell towers in the cell area, in lieu of performing a triangulation logic.

d. paging by the MSC, for routing a received call into the network from a calling telephone device to a called cell phone device, only the called device in the specific cell location that is mapped from the GPS location data of the device in the HLR database, in lieu of paging all the surrounding cells from a last known cell location of the cell phone device.

A method for cellular communication network based emergency response system, has the following steps where all the steps may not be used or used in the order specified:

a. maintaining by a mobile switching center (MSC) of a cellular communication network, in an home location record (HLR) database, a GPS location data of a mobile cell phone device, for devices that are operating in the network;

b. interfacing the MSC to an emergency response (ER) system;

c. retrieving the device's GPS location data from the HLR database by the MSC for a received 911 emergency call for the device and sending to the ER system over the interface.

d. mapping by an emergency responder logic in the ER system, the received GPS location data to (i) an ER region contact data and (ii) to a physical address of the device.

e. creating by the logic and sending a record with the ER region contact data and the device's physical address data to the MSC over the interface;

f. receiving by the MSC the record and routing the 911 call to the ER region contact landline;

g. embedding by the logic a text/voice message with the physical address of the device or sending a separate text message record.

h. mapping by an emergency responder logic in the ER system, mapping the received GPS location data to (i) an ER region contact data and (ii) to a physical address of the handset;

i. routing by the logic the call to a landline number of the ER region and embeds a text message with the physical address of the device to the ER region.

j. retrieving the device's GPS location data by an emergency responder logic in the MSC for a received 911 emergency call from the handset, mapping to a physical address and performing a text to speech conversion of the physical address and embedding the physical address in a routed 911 call to the emergency system.

A method of a cellular communication network operation has the following steps where all the steps may not be used or used in the order specified:

a. maintaining in a mobile switching center (MSC) of a cellular communication network, a GPS location data of a mobile handset, referenced by a mobile identification number (MIN) and an electronic serial number (ESN), in addition to a geographic cell number, in an HLR database for the cell phone devices, operating in the network.

b. retrieving by an emergency responder logic in the MSC, for a received 911 emergency call, the GPS location data of the device, from the HLR database, and converting the GPS physical data to a physical address, and sending a text message with the physical address to an emergency response system.

c. retrieving by the emergency responder logic in the MSC, for a received 911 emergency call, the GPS location data of the device from the HLR database, and converting the GPS location data to a physical address, performing a text to speech conversion of the physical address and embedding in the voice call before routing the call to the emergency response system.

In summary, a cellular communication network with a mobile switching center (MSC) of a cellular communication network maintains a GPS location data of a mobile handset referenced by a mobile identification number (MIN) and an electronic serial number (ESN) in addition to a geographic cell number in an HLR database for handsets operating in the network.

The network uses the GPS location data of the handsets in its network for different purposes, these may include, (i) efficient paging for routing incoming calls, (ii) efficient location data response to emergency responders, and (iii) more efficient management of battery in the handsets.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A cellular communication network based emergency response system, comprising:
   a. a mobile switching center (MSC) of a cellular communication network that maintains, in an home location record (HLR) database, in addition to identification of cell towers, a GPS location data of a mobile cell phone device, for devices that are operating in the network;
   b. the MSC has an interface to an emergency response (ER) system;
   c. the MSC for a received 911 emergency call from a wireless device retrieves the device's GPS location data from the HLR database and sends to the ER system over the interface.

2. The network as in claim 1, comprising:
   an emergency response logic in the ER system maps the received GPS location data to (i) an ER region contact data from a pre-stored ER region contact database and (ii) maps the GPS location data to a physical address of the device.

3. The network as in claim 2, comprising:
   a. the logic creates and sends a record with the ER region contact data and the device's physical address data to the MSC over the interface;
   b. the MSC receives the record and routs the 911 call to the ER region contact landline;
   c. the logic embeds a text/voice message with the physical address of the device or sends a separate text message record.

4. The network as in claim 1, comprising:
   the MSC for a received 911 emergency call from a device retrieves the device's GPS location data from the HLR database and routs the call with the location data to an ER system.

5. The network as in claim 4, comprising:
   a. an emergency responder logic in the ER system, maps the received GPS location data to (i) an ER region contact data and (ii) to a physical address of the device;
   b. the logic routs the call to a landline number of the ER region and embeds a text message with the physical address of the handset to the ER region.

6. The network as in claim 1, comprising:
   an emergency responder logic in the MSC for a received 911 emergency call from the device retrieves the device's GPS location data, maps to a physical address and performs a text to speech conversion of the physical address and embeds the physical address in a routed 911 call to the emergency system.

7. A method for cellular communication network based emergency response system, comprising the steps of:
   a. maintaining by a mobile switching center (MSC) of a cellular communication network, in an home location record (HLR) database, in addition to identification of cell towers, a GPS location data of a mobile cell phone device, for devices that are operating in the network;
   b. interfacing the MSC to an emergency response (ER) system;
   c. retrieving the device's GPS location data from the HLR database by the MSC for a received 911 emergency call for the device and sending to the ER system over the interface.

8. The method as in claim 7, comprising the steps of:
   mapping by an emergency responder logic in the ER system, the received GPS location data to (i) an ER region contact data and (ii) to a physical address of the device.

9. The method as in claim 8, comprising the steps of:
   a. creating by the logic and sending a record with the ER region contact data and the device's physical address data to the MSC over the interface;
   b. receiving by the MSC the record and routing the 911 call to the ER region contact landline;
   c. embedding by the logic a text/voice message with the physical address of the device or sending a separate text message record.

10. The method as in claim 8, comprising the steps of:
    a. mapping by an emergency responder logic in the ER system, mapping the received GPS location data to (i) an ER region contact data and (ii) to a physical address of the handset;
    b. routing by the logic the call to a landline number of the ER region and embeds a text message with the physical address of the device to the ER region.

11. The method as in claim 8, comprising the steps of:
    retrieving the device's GPS location data by an emergency responder logic in the MSC for a received 911 emergency call from the handset, mapping to a physical address and performing a text to speech conversion of the physical address and embedding the physical address in a routed 911 call to the emergency system.

12. A method of a cellular communication network operation, comprising the steps of:
    maintaining in a mobile switching center (MSC) of a cellular communication network, a GPS location data of a mobile handset, referenced by a mobile identification number (MIN) and an electronic serial number (ESN), in addition to identification of cell towers, in an HLR database for the cell phone devices, operating in the network.

13. The method of network operation as in claim 12, comprising the steps of:
    retrieving by an emergency responder logic in the MSC, for a received 911 emergency call, the GPS location data of the device, from the HLR database, and converting the GPS physical data to a physical address, and sending a text message with the physical address to an emergency response system.

14. The method of network operation as in claim 12, comprising the steps of:
    retrieving by the emergency responder logic in the MSC, for a received 911 emergency call, the GPS location data of the device from the HLR database, and converting the GPS location data to a physical address, performing a text to speech conversion of the physical address and embedding in the voice call before routing the call to the emergency response system.

15. An emergency response system for a wireless network, comprising:
   a. a logic operable in a server of the emergency response system that receives a lat/long data of a received 911 call, of a cell phone device operating in the wireless network, from a mobile switching center of the wireless network;
   b. the logic interfaces with a ER database system, the ER database system maps the lat/long data to a physical address and the logic retrieves the device's physical address from the database.

16. The ER system as in claim 15, further comprising:
the logic sends the physical address data to the mobile switching center.

17. The ER system as in claim 15, further comprising:
   a. the ER database system, also sends to the logic the ER region where the device is located and the landline number of the ER region;
   b. the logic sends both the device's physical address and the ER region landline number to the mobile switching center for the mobile switching center, thereby the mobile switching center is able to route the 911 emergency call to the specific ER region where the device is located as well as the physical address of the device.

18. The ER system as in claim 15, further comprising:
the ER database system stores the cities in each of the ER regions and the physical addresses in each city along with their lat/long data.

19. The ER system as in claim 15, further comprising:
the ER database system stores ER region details including address and landline contact numbers.

20. The ER system as in claim 15, further comprising:
the ER database system stores for each of the cities in each of the ER regions, the landmarks including parks, highways, libraries, points of interest and their physical addresses along with their lat/long data.

* * * * *